Aug. 22, 1950     G. H. WILKINSON     2,519,527
ELECTRIC DRY BATTERY
Filed March 20, 1947
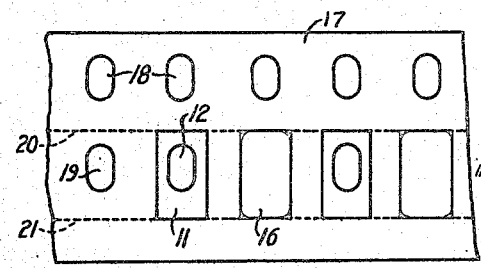
Fig. 1.
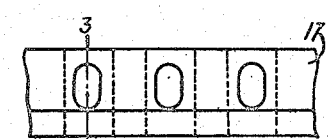
Fig. 2.
Fig. 3.
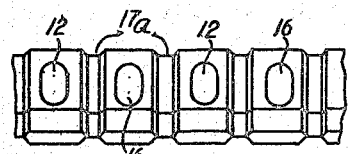
Fig. 4.
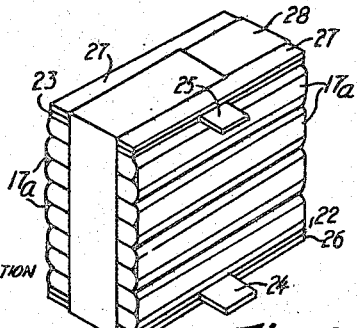
Fig. 6.
Fig. 5.
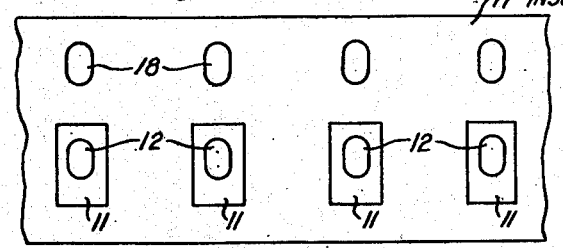
Fig. 7.
Fig. 9.
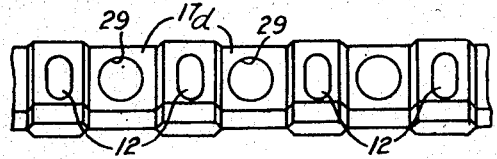
Fig. 8.
Fig. 11
Fig. 12
Fig. 13
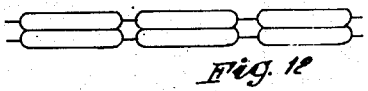
Fig. 10.
Inventor:
George Henry Wilkinson
By *J. O. Oliver*
Attorney.
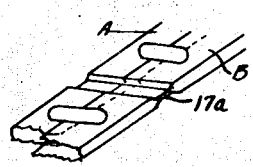
Fig. 14

Patented Aug. 22, 1950

2,519,527

UNITED STATES PATENT OFFICE 2,519,527

ELECTRIC DRY BATTERY

George Henry Wilkinson, Harlington, England, assignor to Electric & Musical Industries Limited, Hayes, England, a company of Great Britain Application March 20, 1947, Serial No. 735,950
In Great Britain March 19, 1942

Section 1, Public Law 690, August 8, 1946
Patent expires March 19, 1962

11 Claims. (Cl. 136—111)

This invention relates to electric dry batteries of the kind comprising a plurality of substantially flat cells, each cell comprising a number of elements namely a positive and negative electrode, a depolarising agent and an electrolyte, these cell elements being superimposed in proper sequence and the cells so formed being arranged face-to-face to form a battery.

In batteries of this kind it is important to ensure that creepage of the electrolyte of one cell to another cell is prevented or reduced to a minimum and various proposals have heretofore been made for this purpose.

The object of the present invention is to provide an improved battery in which effective steps are taken to guard against the creeping of electrolyte from one cell to another but in which the necessity for separately sheathed cells is avoided, so facilitating manufacture.

According to one feature of the present invention an electric dry battery of the kind referred to is provided in which a plurality of electrolyte cell elements or a plurality of groups of cell elements, each group containing an electrolyte element, are arranged in a common sheath of flexible electrolyte-resisting dielectric material, said sheath being perforated and so applied to said plurality of cell elements or groups as to form separate compartments within each of which one of said cell elements or groups is enclosed with portions of the faces of said cell elements or groups exposed through lateral perforations in the sides of the compartments and said cell elements or groups are held together under pressure so that said sheath prevents or substantially reduces the escape of electrolyte from one cell to another whilst electrical contact between adjacent cells is obtained through said perforations.

According to a further feature of the invention a method of making an electric dry battery of the kind referred to is provided in which said sheath is folded so as to bring said cell elements or groups into co-operative relationship with the aid if necessary of further cell elements so as to form a battery of cells and then securing said cells together under pressure.

According to a further feature of the invention a method of making an electric dry battery of the kind referred to is provided in which the cell elements or groups are arranged edge to edge but spaced apart with portions of the faces of said cell elements or groups exposed through lateral perforations in the sheath compartments, then securing the opposite surfaces of said sheath together at the spaces between said cell elements or groups so as to form separate compartments within which the said cell elements or groups are separately enclosed.

According to another feature of the invention a method of making an electric dry battery of the kind referred to is provided which comprises applying the plurality of spaced electrolyte cell elements or a plurality of spaced groups of cell elements to the perforated strip so that one face of each of said elements or groups is exposed through one of the perforations, then folding said strip so that its longitudinal edges overlap one another on the opposite faces of each of said elements or groups so that the other faces are also exposed through perforations, and then securing together opposite surfaces of said strip which lie between adjacent edges of said cell elements or groups so as to enclose each of said cell elements or groups in a separate compartment.

According to yet another feature of the invention a method of making electric dry batteries of the kind referred to in a continuous manner is provided which comprises severing a plurality of said cell elements or groups arranged in said common sheath and arranging them to form a battery with the aid, if necessary, of further cell elements.

The cell elements or groups can conveniently be assembled to form a battery by folding said sheath at the opposite surfaces which are secured together so that the cell elements or groups assume a zigzag formation, the elements or groups being then pressed together to provide the necessary electrical contact. The assembled battery may then be bound to hold the elements in the desired relationship under pressure and then the bound battery may be coated with or dipped in wax or some other moisture-resisting material, such as rubber solution.

It is not necessary that the cell elements provided in the separate compartments should constitute in themselves individual cells since, in some cases, it may be preferred, for example, to arrange the depolarising element which may be in the form of a flat tablet and the electrolyte element which may comprise a piece of gauze impregnated with an appropriate electrolyte in the same compartment, and the necessary positive and negative electrodes may be inserted in the appropriate positions during assembly to form the battery. Preferably, however, each compartment contains four elements, the positive and negative electrodes being of a composite construction comprising a plate of zinc with an adhering coating of carbon. Other methods of grouping the cell elements may, if desired, be employed.

In order that the invention may be clearly understood and readily carried into effect, it will now be more fully described with reference to the accompanying drawings which illustrate several embodiments of the invention, in which—

Figure 1 is a plan view of a portion of said material with cell elements or groups arranged in position prior to forming the sheath, Figure 2 illustrates the cell elements or groups after one stage of the sheathing operation, Figure 3 is a cross-section on an enlarged scale taken along the line 3—3 of Figure 2, Figure 4 illustrates the cell elements or groups after completing the sheathing operation, Figure 5 is a view on an enlarged scale illustrating the method of assembling the cell elements or groups to form a battery.

Figure 6 is a perspective view illustrating the completed cell assembly,

Figures 7, 8 and 9 are views similar to Figures 1, 2 and 5 illustrating a further embodiment of the invention, Figure 10 is a cross-sectional view illustrating a further embodiment of the invention, Figure 11 is a cross-section similar to Figure 3 but showing a modified form of carbon-zinc element, Figures 12 and 13 illustrate different methods of assembling the cell elements or groups, and Figure 14 shows a sheath formed of two overlapping strips.

The two embodiments of the invention shown in Figures 1 to 9 illustrate the invention as applied to the manufacture of batteries in which groups of cell elements are arranged in separate compartments in a common sheath, each group forming an individual cell.

Referring first to Figures 1 to 6 of the drawings, each cell is composed of four cell elements comprising a rectangular tablet 11 of depolarising material having on one side a protuberance 12 and adjacent the side of the tablet 11 opposite the protuberance 12 is a gauze pad 13 impregnated with a suitable electrolyte solution and having a thin layer of electrolyte paste 14 which is in intimate contact with the zinc surface of a composite carbon-zinc element which comprises a zinc plate 15 having an adhering coating of carbon 16. The zinc plate 15 preferably has rounded corners as shown in Figure 1. The common sheath for the cells is made from a strip 17 of flexible electrolyte-resisting dielectric sheet material which is provided with two longitudinal rows of perforations 18 and 19 arranged in the manner shown. The cells are applied over the row of perforations 19 as shown in Figure 1, alternate cells being arranged with the tablet 11 uppermost and the other cells with the carbon layer 16 uppermost. The size of the protuberances 12 is such that they can protrude through the perforations 18 or 19. The strip 17 may be formed of rubber or a synthetic rubber compound in which case over the entire surface of the strip 17 to which the cells are applied a coating of adhesive is provided. The upper portion of the strip 17 shown in Figure 1 is folded or wrapped over the exposed surfaces of the cells by folding said portion along the dotted line 20, the perforations 18 registering with the protuberances 12. The lower portion of the strip 17 is then folded along the dotted line 21 and arranged to overlap the edge of the upper portion of the strip 17 as shown in Figures 2 and 3. The opposite portions of the strip 17 extending between the adjacent edges of the cells are now pressed together as shown at 17a in Figure 4. Since the strip 17 is coated with adhesive, the portions of the strip 17 between the adjacent cells will adhere and likewise the overlapping edges. The strip 17 will also adhere to the surfaces of the tablet 11 and the carbon layer 16 with which it engages. If desired the strip 17 may be formed of thermoplastic sheet material or bitumen coated paper in which case the portions of the strip shown at 17a can be caused to adhere, without the aid of a separately applied coating of adhesive, on the application of heat and pressure. Preferably a space is left between the strip 17 and the edges of the cells so as to permit breathing of the cells when in use and if desired the strip 17 may be appropriately fluted where necessary to permit the required space to be left. The cells are thus enclosed in separate compartments formed by the strip 17, opposite faces of each cell being, however, exposed through the perforations 18 and 19. The folding or wrapping operation and the pressure and heat if necessary which is applied to cause opposite portions of the strip between adjacent groups to adhere can be effected mechanically, the required operations, together with the feeding of the cells to the strip 17 being effected in proper sequence. By sheathing the cells in the above manner it is possible to manufacture the sheathed cells in a continuous manner, the requisite number of cells to provide a battery of predetermined voltage being severed as required. To assemble the sheathed cells to form a battery the strip 17 is folded at the portions 17a so that the sheathing and the cells assume a zigzag formation as shown in Figure 5 with the appropriate surfaces of the cell elements facing one another. This folding operation can also be effected mechanically. To complete the assembly, conducting plates 22 and 23 are applied to the end cells as shown in Figure 5, these plates having lugs 24 and 25 which form the terminals of the battery. A portion of the strip 17 preferably extends over the outer surfaces of the plates 22 and 23, as shown at 17b and 17c in Figure 5, and on each end of the battery plates 26 and 27 of insulating material are applied. Suitable pressure is now applied to the stack to cause the surfaces of the cell elements exposed through the perforations 18 and 19 firmly to engage one another and to cause the portions of the strip 17 bounding the apertures 18 and 19 to be pressed into firm contact with the sides of the cells. Whilst in the compressed condition the stack is bound together by a strip of adhesive coated paper 28, as shown in Figure 6. Instead of using a paper strip 28 the stack may be bound with thread. The stack is then provided with an exterior coating of wax, bitumen or rubber, in any suitable manner. It will thus be appreciated that by manufacturing batteries in the manner described the necessity for separately sheathed cells is avoided so facilitating manufacture. By sheathing the group of cell elements in the manner described, an effective seal is provided which prevents or substantially reduces the escape of electrolyte from one cell to another in the assembled battery.

Figures 7, 8 and 9 of the drawings illustrate a modified form of the invention in which the cells are more widely spaced on the strip 17 compared with the spacing shown in Figure 1 so as to provide a sufficient length of material 17d between the adjacent cells to enable said length 17d when the cells are caused to assume their zigzag formation to lie between adjacent cells, as shown in Figure 9. In this formation of the invention the perforations 18 and 19 are of course more widely spaced than the perforations 18 and 19 of Figure 1 and to provide contact between adjacent cells the length 17d is also perforated at 29, as shown in Figure 8, these perforations being preferably provided after the material between adjacent cells has been caused to adhere. In this embodiment either the tablets 11 or the carbon layers are uppermost so that these elements do not alternate as in the embodiment of Figure 1.

Figure 10 of the drawings illustrates a further embodiment of the invention in which the depolarising tablet 11 and the gauze pad 13 are arranged in one compartment and the carbon-zinc element 15, 16 is arranged in another compartment. As stated above other methods of assembling the cell elements may be employed, for example, only the elements 11 and 13 need be arranged in said separate compartments and during folding of the elements 11 and 13 to their zigzag formation the carbon-zinc elements may be interposed between the wrapped elements 11 and 13.

If desired, the carbon-zinc element may be of of a dished form so that its edges can enclose the edges of the other elements of the cell as indicated in Figure 11. Further, if desired instead of folding the sheathed elements so that they assume the zigzag formation aforesaid, a row of sheathed elements in the condition shown in Figure 4 or 8 may be placed face-to-face with one or more other rows of sheathed elements to form a battery as indicated in Figure 12. Further, a long row of sheathed elements may be folded to assume a zigzag formation but each limb of the formation may include a plurality of said compartments as indicated in Figure 13.

Instead of using a single strip 17 as above described to provide a common sheath for a plurality of cell elements or groups as aforesaid, two strips A and B may be used as indicated in Figure 14, each strip having recesses along its longitudinal edges, said strips being applied to the cell elements or groups in such a manner that the longitudinal margins of the said strips overlap over an area extending to each side of a line passing through the centre of the row of cell elements shown in Figure 1, the recesses on one strip registering with the recesses on the other strip so as to provide perforations on both faces of the cell elements or groups as shown in Figure 3. Thereafter the opposite portions are secured together as at 17a and the battery assembled as above described.

What I claim is:

1. An electric dry battery wherein a plurality of battery cells, each cell including an electrolyte cell element, are arranged in a common sheath of flexible electrolyte-resisting dielectric material, said sheath being perforated and applied to said plurality of cells to form separate compartments within which said cells are individually enclosed with portions of the faces of said cells exposed through the perforations in said sheath, and means for pressing said cell elements together, whereby said sheath at least reduces the escape of electrolyte from one cell to another whilst electrical contact between adjacent cells is obtained through said perforations.

2. A method of making an electric dry battery which comprises arranging in a common perforated sheath of flexible electrolyte-resisting dielectric material a plurality of battery cells, each cell containing an electrolyte cell element, forming said sheath with each of said cells in a separate compartment with the faces of said cells exposed through the perforations in said sheath, folding said sheath to bring said cells into conductive relationship to form a battery of cells, and then securing said cells together under pressure.

3. A method of making an electric dry battery which comprises enclosing a plurality of battery cells, each cell containing an electrolyte cell element in a common perforated sheath of flexible electrolyte-resisting dielectric material with said cells arranged edge to edge but spaced apart with portions of the faces of said cells exposed through perforations in said sheath, then securing the opposite surfaces of said sheath together at the spaces between said cells to form separate compartments within which said cells are individually enclosed, then folding said sheath to bring adjacent cells into electrical contact with each other through the perforations in the sheath, and then securing said cells together under pressure.

4. A method according to claim 2, wherein said sheath is formed by folding sheet material having edge recesses to bring the recessed edges together to provide the perforations.

5. A method of making an electric dry battery which comprises applying in spaced relationship to a perforated strip of flexible electrolyte-resisting dielectric sheet material a plurality of battery cells, each cell containing an electrolyte cell element, with one face of each of said elements exposed through a perforation in said strip, then folding said strip to overlap its longitudinal edges on the opposite faces of said elements and with said overlapped faces also exposed through perforations, then securing together opposite surfaces of said strip which lie between adjacent edges of said cells to enclose each of said cells in a separate compartment, folding said strip to bring adjacent cells into electrical contact with each other through the perforations in the strip, and then securing said cells together under pressure.

6. A method of making electric dry batteries in a continuous manner which comprises arranging a plurality of battery cells, each containing an electrolyte cell element, in a common perforated sheath of flexible electrolyte-resisting dielectric material with each of said cells in a separate compartment with the faces of said cells exposed through perforations in said sheath, then severing a plurality of said cells in a common length of said sheath, and bringing each cell into electrical contact with other cells through the sheath perforations to form a battery.

7. A method according to claim 3, wherein the cells are brought into contact by folding the sheath between adjacent cells to produce a zigzag form.

8. A method according to claim 7, wherein the sheath material extending between adjacent cells is folded between said adjacent cells with said adjacent cells in electrical contact through perforations in the sheath.

9. A method according to claim 2, wherein the sheath material is coated with adhesive over its entire surface to cause its contacting surfaces to adhere.

10. A method according to claim 3, wherein said sheath material is formed of a thermoplastic substance, and heat and pressure are applied to said opposite surfaces to secure them together.

11. A method according to claim 2 wherein each cell includes a depolarising agent in the form of a tablet having a protuberance on one face protruding through a perforation in said sheath.

GEO. H. WILKINSON.

REFERENCES CITED

The following references are of record in the file of this patent:

UNITED STATES PATENTS

| Number | Name | Date |
|---|---|---|
| 2,042,806 | Schulte | June 2, 1936 |
| 2,416,079 | Anthony | Feb. 18, 1947 |

FOREIGN PATENTS

| Number | Country | Date |
|---|---|---|
| 647,985 | France | Aug. 6, 1928 |